(12) United States Patent
Trika et al.

(10) Patent No.: US 11,003,479 B2
(45) Date of Patent: May 11, 2021

(54) DEVICE, SYSTEM AND METHOD TO COMMUNICATE A KERNEL BINARY VIA A NETWORK

(71) Applicant: Intel Corporation, Santa Clara, CA (US)

(72) Inventors: Sanjeev Trika, Portland, OR (US); Bishwajit Dutta, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 66 days.

(21) Appl. No.: 16/398,017

(22) Filed: Apr. 29, 2019

(65) Prior Publication Data

US 2019/0258504 A1  Aug. 22, 2019

(51) Int. Cl.
*G06F 9/455* (2018.01)
*G06F 9/50* (2006.01)
*G06F 9/445* (2018.01)

(52) U.S. Cl.
CPC ...... *G06F 9/45558* (2013.01); *G06F 9/44505* (2013.01); *G06F 9/505* (2013.01); *G06F 2009/4557* (2013.01); *G06F 2009/45583* (2013.01); *G06F 2009/45595* (2013.01)

(58) Field of Classification Search
CPC .. G06F 9/44505; G06F 9/45558; G06F 9/505; G06F 2009/4557; G06F 2009/45583; G06F 2009/45595
USPC ........................................................ 717/140
See application file for complete search history.

(56) References Cited

U.S. PATENT DOCUMENTS

| | | | |
|---|---|---|---|
| 10,423,463 B1* | 9/2019 | Wilt ...................... | G06F 9/5044 |
| 10,554,685 B1* | 2/2020 | McArdle ............. | G06F 9/45558 |
| 10,628,177 B1* | 4/2020 | Eyberg ................ | G06F 9/45508 |
| 2009/0083375 A1* | 3/2009 | Chong ............... | H04N 21/4828 |
| | | | 709/203 |

(Continued)

OTHER PUBLICATIONS

Y. Weinsberg, D. Dolev, P. Wyckoff and T. Anker, "Accelerating Distributed Computing Applications Using a Network Offloading Framework," 2007 IEEE International Parallel and Distributed Processing Symposium, Rome, 2007, pp. 1-10, doi: 10.1109/IPDPS.2007.370319. (Year: 2007).*

(Continued)

*Primary Examiner* — Andrew M. Lyons
(74) *Attorney, Agent, or Firm* — Green, Howard & Mughal LLP.

(57) ABSTRACT

Techniques and mechanisms for communicating compiled software instructions via a network, wherein the compiled instructions are to execute a kernel process of a network device. In an embodiment, a first node of a network receives a kernel source code from a second node of the network. The first node compiles the kernel source code to generate a kernel binary code, which is provided to the second node. Based on the kernel binary code being communicated to the second node, a software developer is able to perform a simulation that facilitates the development of an application binary code. The first node subsequently receives the application binary and an indication that the application binary is to be executed with the kernel binary at the first node. In some embodiments, the first node executes an application process and a kernel process to provide an application offload resource for another network node.

19 Claims, 8 Drawing Sheets

(56) References Cited

U.S. PATENT DOCUMENTS

| | | | | |
|---|---|---|---|---|
| 2014/0123101 | A1* | 5/2014 | Kim | G06F 8/41 717/101 |
| 2015/0134107 | A1* | 5/2015 | Hyde | G06F 19/3462 700/237 |
| 2017/0132419 | A1* | 5/2017 | Gupta | G06F 11/3672 |
| 2017/0344354 | A1* | 11/2017 | Schiefelbein | G06F 8/61 |
| 2018/0046457 | A1* | 2/2018 | Branca | G06F 21/577 |
| 2018/0150334 | A1* | 5/2018 | Bernat | G06F 9/3891 |
| 2019/0065281 | A1* | 2/2019 | Bernat | H04L 43/0876 |
| 2019/0190853 | A1* | 6/2019 | Pope | H04L 49/103 |

OTHER PUBLICATIONS

Balasubramonian, Rajeev et al., "Near-Data Processing: Insights from a MICRO-46 Workshop", IEEE Computer Society, 2014, 7 pgs.

Bertschmann, Roger, "Computational Storage using NVM Express", Storage Visions 2018, 5 pgs.

Choi, I. S. et al., "Energy Efficient Scale-In Clusters with In-Storage Processing for Big-Data Analytics", MEMSYS '15, Oct. 5-8, 2015, 9 pgs.

Doller, Edward et al., "DataCenter 2020: Near-memory Acceleration for Data-oriented Application", 2014 Symposiums on VLSI Circuits Digest of Technical Papers, 4 pgs.

Doller, Edward M., "Storage Architecture for the Data Center in 2020", Flash Memory Summit 2013, 22 pgs.

Eisenman, Assaf et al., "Reducing DRAM Footprint with NVM in Facebook", EuroSys '18, Apr. 23-26, 2018, 13 pgs.

Gaysse, Jerome, "A Comparison of In-Storage Processing Architecture and Technologies", SDC '18, Sep. 24-27, 2018, 50 pgs.

Gu, Boncheol et al., "Biscuit: a Framework for Near-Date Processing of Big Data Workloads", 2016 ACM/IEEE 43rd Annual International Symposium on Computer Architecture, 13 pgs.

Jun, Sang-Woo et al., "BlueDBM: Distributed Flash Storage for Big Data Analytics", ACM Trans. Comput. Syst. 34, 3, Article 7, Jun. 2016, 31 pgs.

Kang, Yangwook et al., "Enabling Cost-effective Data Processing with Smart SSD", Received from Client Feb. 2019, 12 pgs.

Ki, Yang S. et al., "In-Storage Compute: an Ultimate Solution for Accelerating I/O-intensive Applications", Aug. 13, 2015, 30 pgs.

Koo, Gunjae et al., "Summarizer: Trading Communication with Computing Near Storage", MICRO 17, Oct. 14-18, 2017, 13 pgs.

Kulkarni, Chinmay et al., "Splinter: Bare-Metal Extensions for Multi-Tenant Low-Latency Storage", Proceeding of the 13th USENIX Symposium on Operating Systems Design and Implementation (OSDI '18), 19 pgs.

Martin, Bill et al., "Storage Intelligence in SSDs and Standards", Storage Developer Conference 2015, 17 pgs.

Muthal, Manish et al., "Platforms for the Adaptable Intelligent World", Oct. 23, 2018, 7 pgs.

Park, Dongchul et al., "In-Storage Computing for Hadoop MapReduce Framework: Challenges and Possibilities", IEEE Transactions on Computers, Jul. 2015, 14 pgs.

Shadley, Scott, "Deploying In-Storage Compute", Storage Visions 2018, 4 pgs.

Wang, Jianguo et al., "SSD In-Storage Computing for List Intersection", DaMoN' 16, Jun. 27, 2016, 7 pgs.

Wang, Jianguo et al., "SSD In-Storage Computing for Search Engines", IEEE 2016, 14 pgs.

* cited by examiner

DEVICE, SYSTEM AND METHOD TO COMMUNICATE A KERNEL BINARY VIA A NETWORK

BACKGROUND

1. Technical Field

This disclosure generally relates to software distribution and more particularly, but not exclusively, to provisioning kernel software instructions via a network.

2. Background Art

Traditionally, solid state drives (SSDs), hard disk drives (HDDs) or other data storage resources are made available to a host system, which is performs all software execution based on data accessed at said storage resources. More recent innovations—generally referred to as "Application Offloading" (or "In-Storage Computing")—variously provide at a storage device at least some instruction execution capability which is in support of the host system.

Application offloading offers significant promise in data centers, cloud computing, and other network-related use cases. However, some attendant challenges posed by these uses cases include: the dissemination of up-to-date software, the need for effective and efficient evaluation of software performance, and the tendency for replaced or modified network-attached hardware to cause erroneous or otherwise inefficient software execution.

As computer networks continue to grow in scale, variety, and capability, there is expected to be an increased premium placed on incremental improvements in the provisioning of up-to-date software in these networks.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Figure 1:
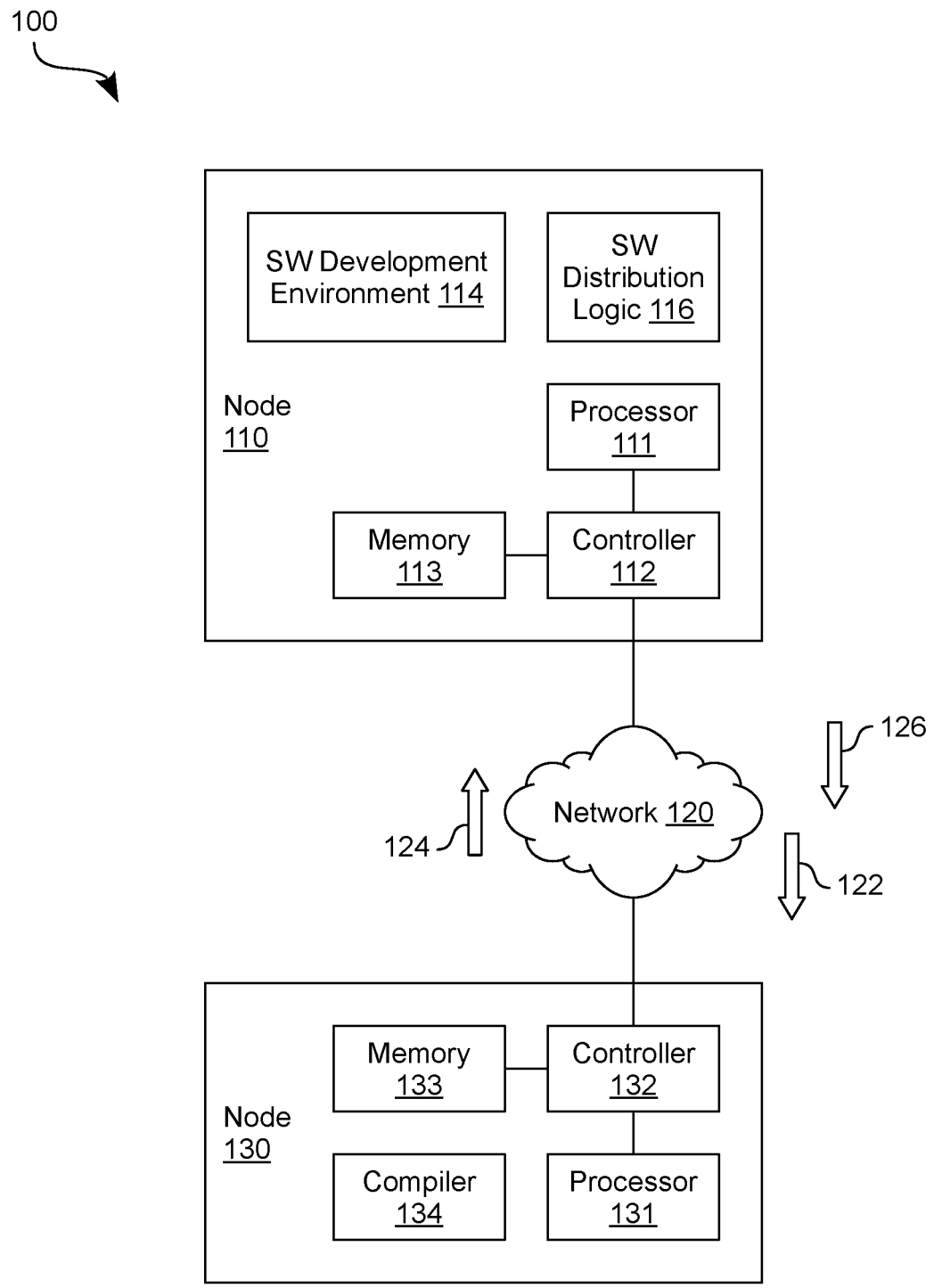
FIG. 1 shows a functional block diagram illustrating elements of a system to communicate software code via a network according to an embodiment.

Embodiments discussed herein variously provide techniques and mechanisms for communicating compiled software instructions via a network, wherein the compiled instructions are to execute a kernel process of a network device. In an embodiment, a kernel binary is compiled by a network node based on information which describes a hardware configuration of that network node. The kernel binary is subsequently communicated from that network node, for example, to facilitate software development of an application binary which is to execute with the kernel binary.

Certain features of various embodiments are described herein with reference to source code instructions for a software kernel (referred to herein as "kernel source"), where said instructions are communicated via a network and subsequently compiled to generate a "kernel binary"—i.e., binary code instructions to implement the software kernel. A software kernel (for brevity, "kernel" herein) provides some or all functionality of a computer operating system—e.g., at least a core of an operating system that provides basic services for one or more other parts (if any) of the operating system. In some embodiments, for example, a kernel includes an interrupt handler that handles all requests or completed I/O operations that compete for the kernel's services, a scheduler that determines which programs share the kernel's processing time in what order, and a supervisor that variously gives use of computer hardware to a given process when it is scheduled. Alternatively or in addition, a kernel includes a manager of an operating system's address spaces in memory or storage—e.g., sharing these among all components and other users of the kernel's services. The kernel's services are requested by other parts of the operating system, for example, or by application through a specified set of program interfaces sometimes known as system calls.

A kernel is to be distinguished, for example, from an application process which executes with the kernel on the same platform—e.g., where the kernel services requests by the application process. Some embodiments variously facilitate the development and/or the communication of additional software instructions to execute an application process with a kernel process. Such additional software instructions include, for example, source code instructions for the application (referred to herein as "application source") and/or binary code instructions to implement the application (referred to herein as "application binary").

As used herein in the context of software instructions, "source code," "source" and related terms generally refer to instructions in a "human-readable" language, such as C++, Java, Python, or the like. By contrast, "binary code," "binary" and related terms generally refer to instructions which are represented as binary data—e.g., where such binary data is generated by a compiling of corresponding source code.

The technologies described herein may be implemented in one or more electronic devices. Non-limiting examples of electronic devices that may utilize the technologies described herein include any kind of mobile device and/or stationary device, such as cameras, cell phones, computer terminals, desktop computers, electronic readers, facsimile machines, kiosks, laptop computers, netbook computers, notebook computers, internet devices, payment terminals, personal digital assistants, media players and/or recorders, servers (e.g., blade server, rack mount server, combinations thereof, etc.), set-top boxes, smart phones, tablet personal computers, ultra-mobile personal computers, wired telephones, combinations thereof, and the like. More generally, the technologies described herein may be employed in any of a variety of electronic devices including circuitry to communicate, and in some embodiments, to compile, a kernel binary.

In the following description, numerous details are discussed to provide a more thorough explanation of the embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The term "device" may generally refer to an apparatus according to the context of the usage of that term. For example, a device may refer to a stack of layers or structures, a single structure or layer, a connection of various structures having active and/or passive elements, etc. Generally, a device is a three-dimensional structure with a plane along the x-y direction and a height along the z direction of an x-y-z Cartesian coordinate system. The plane of the device may also be the plane of an apparatus which comprises the device.

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value.

It is to be understood that the terms so used are interchangeable under appropriate circumstances such that the embodiments of the invention described herein are, for example, capable of operation in other orientations than those illustrated or otherwise described herein.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

The terms "left," "right," "front," "back," "top," "bottom," "over," "under," and the like in the description and in the claims, if any, are used for descriptive purposes and not necessarily for describing permanent relative positions. For example, the terms "over," "under," "front side," "back side," "top," "bottom," "over," "under," and "on" as used herein refer to a relative position of one component, structure, or material with respect to other referenced components, structures or materials within a device, where such physical relationships are noteworthy. These terms are employed herein for descriptive purposes only and predominantly within the context of a device z-axis and therefore may be relative to an orientation of a device. Hence, a first material "over" a second material in the context of a figure provided herein may also be "under" the second material if the device is oriented upside-down relative to the context of the figure provided. In the context of materials, one material disposed over or under another may be directly in contact or may have one or more intervening materials. Moreover, one material disposed between two materials may be directly in contact with the two layers or may have one or more intervening layers. In contrast, a first material "on" a second material is in direct contact with that second material. Similar distinctions are to be made in the context of component assemblies.

The term "between" may be employed in the context of the z-axis, x-axis or y-axis of a device. A material that is between two other materials may be in contact with one or both of those materials, or it may be separated from both of the other two materials by one or more intervening materials. A material "between" two other materials may therefore be in contact with either of the other two materials, or it may be coupled to the other two materials through an intervening material. A device that is between two other devices may be directly connected to one or both of those devices, or it may be separated from both of the other two devices by one or more intervening devices.

As used throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C. It is pointed out that those elements of a figure having the same reference numbers (or names) as the elements of any other figure can operate or function in any manner similar to that described, but are not limited to such. It is pointed out that those elements of the figures having the same reference numbers (or names) as the elements of any other figure can operate or function in any manner similar to that described, but are not limited to such.

FIG. 1 shows features of a system 100 to communicate compiled software code via a network according to an embodiment. System 100 is one example of an embodiment wherein kernel source code is received and compiled at a first network node to generate a kernel binary, which is subsequently communicated via a network to another network node. In some embodiments, the other network node provides resources which enable development of an application which is to execute with the kernel binary.

System 100 illustrates an embodiment wherein networked resources are arranged in architectural units that are referred to herein as "nodes." Each node contains respective resources that include, for example, some or all of processor circuitry, a memory, and an input/output device—e.g., wherein a given node is a computer platform, or at least a component thereof. In addition, a given node of system 100 includes one or more buses and/or other interconnect circuitry—e.g., comprising a system bus, a Peripheral Component Interconnect (PCI) bus, a Small Computer System Interface (SCSI) bus, and/or the like—which variously couple components of said node to each other. Those of ordinary skill in the art will appreciate that any of various interconnect architectures are provided at such a node.

As shown in FIG. 1, system 100 includes a first node 110, and a second node 130 which is coupled to node 110 via a network 120. The term "coupled" encompasses a direct connection, an indirect connection, an indirect communication, etc. Network 120 includes any of various types of communication networks through which a plurality of different devices are to communicate. In one embodiment, network 120 includes one or more wired networks and/or one or more wireless networks—e.g., wherein network 120 comprises a wide area network (WAN), a local area network (LAN), metropolitan area network (MAN), an intranet, or the like. It should be understood that network 120, in some embodiments, includes one or more additional nodes, subnets, and/or other devices (e.g., switches, routers, hubs, etc.), which have been omitted from FIG. 1 for ease of understanding.

In the example embodiment shown, node 110 includes one or more processors (e.g., including processor 111) which are operable to process instructions of an operating system and, for example, other executing software. Processor 111 includes one of more processor cores of a central processing unit (CPU), for example. Node 110 also includes a memory 113 which, for example, comprises any of various suitable random access memories including, but not limited to, a static random access memory (SRAM), a dynamic random access memory (DRAM), a synchronous DRAM (SDRAM), and/or a double data rate DRAM (DDRDRAM). In such an embodiment, controller circuitry of node 110 (e.g., including the illustrative controller 112) is coupled to provide processor 111 with access to memory 113. Additionally or alternatively, the same (or other) controller circuitry of node 110 facilitates input and/or output (IO) connectivity with network 120.

In one such embodiment, circuit resources of node 130 similarly includes (for example) a processor 131, a memory 133, and a controller 132, which provide functionality which is similar, in one or more respects, to that of processor 111, memory 113, and controller 112 (respectively). It should be understood that nodes 110, 130 are intended to represent an exemplary embodiment of network resources, and that additional components of nodes 110, 130 have been omitted from representation in FIG. 1 for clarity and ease of understanding.

In some embodiments, first node 110 comprises logic—such as the illustrative software (SW) distribution logic 116 shown—which facilitates a communication of software instructions between nodes of system 100. In one such embodiment, first node 110 is operable to further provide a SW development environment 114 with which at least some software instructions are generated. For example, SW development environment 114 provides a user interface (UI), a command-line interface and/or one or more other development tools to be made available to a software developer or other such user.

The term "logic" as referred to herein relates to structure for performing one or more logical operations. Such logic comprises (for example) circuitry which provides one or more output signals based upon one or more input signals. In an embodiment, such circuitry comprises a finite state machine which receives a digital input and provides a digital output, or circuitry which provides one or more analog output signals in response to one or more analog input signals. Additionally or alternatively, such circuitry is provided by an application specific integrated circuit (ASIC), a FPGA, or the like. Additionally or alternatively, said logic comprises machine-readable instructions stored in a storage medium in combination with processing circuitry to execute such machine-readable instructions. However, these are merely examples of structures which may provide logic and some embodiments are not limited in this respect.

SW distribution logic 116 is provided, for example, by dedicated circuit logic of node 110 and/or by software which executes with processor 111. In one such embodiment, SW distribution logic 116 communicates with SW development environment 114 to receive or otherwise identify software instructions which are to be communicated to another node of system 100 (such as node 130). In an example scenario according to one embodiment, a software developer interacts with a graphical user interface (GUI) and/or other tool of SW development environment 114 to write, upload or otherwise provide source code, binary code, and/or other such machine accessible instructions. As described herein, some embodiments variously facilitate a communication—e.g., with SW distribution logic 116—of a kernel source between nodes of system 100, wherein the kernel source is to be compiled at another node to generate a kernel binary. In some embodiments, the kernel binary is subsequently communicated between nodes of system 100—e.g., wherein the kernel binary is to be made available to a developer or other user via SW development environment 114.

Certain features of various embodiments are described below with respect to an illustrative scenario wherein an application developer (or other such user) inputs, uploads or otherwise identifies a kernel source 122 to node 110—e.g., via interactions with SW development environment 114 thereof. Based on such interaction, node 130 is identified (with SW distribution logic 116 and/or a node coupled between nodes 110, 130) as a target node which is to receive kernel source 122. The kernel source is subsequently routed or otherwise communicated via network 120 to node 130. Circuitry of node 130 (e.g., the circuitry including that of controller 132) provides kernel source 122 to a compiler 134. In some embodiments, the compiler 134 of node 130 compiles kernel source 122 to generate a kernel binary 124—e.g., where kernel binary 124 is automatically generated independent of user interaction with an IO mechanism (if any) at node 130 to explicitly request such compiling.

Although some embodiments are not limited in this regard, a data storage resource of node 130 (e.g., including memory 133) stores reference information which describes a configuration of hardware at node 130. In one such embodiment, the compiling of kernel source 122 to generate kernel binary 124 comprises compiler 134 accessing such reference information to determine one or more compilation parameters based on the hardware configuration. Alternatively or in addition, one or more compilation parameters—other than kernel source 122 itself—are provided to compiler 134 by node 110 (e.g., by SW development environment 114).

Subsequently, controller 132 (or other control logic of node 130) communicates kernel binary 124 from node 130 to network 120. For example, kernel binary 124 is automatically communicated back to node 110, or is otherwise made available for use in subsequent software development such as that which uses functionality of SW development environment 114. Such software development includes any of various simulation, debug, testing and/or other operations which, for example, contribute to the generation of other source code (referred to herein as an "application source") for an application which is to execute with the kernel process that is provided with kernel binary 124. Additionally or alternatively, such software development includes compiling said application source to generate binary code (referred to herein as an "application binary") for said application.

The resulting application binary is subsequently communicated to node 130 via network 120, although some embodiments are not limited in this regard. By way of illustration and not limitation, a communication 126 between nodes 110, 130 comprises the application binary, and an instruction (or other such indication) that the application binary is to execute with kernel binary 124. For example, communication 126 comprises the application binary and a copy of kernel binary 124, in some embodiments.

In another embodiment, the indication that the application binary is to execute with kernel binary 124 comprises a unique identifier kb_id that has been assigned to kernel binary 124. For example, in some embodiments, logic of node 130 assigns the identifier kb_id to kernel binary 124, where memory 133 (or another such resource of node 130) stores a local copy of kernel binary 124 in addition to the corresponding identifier kb_id. In one such embodiment, both kernel binary 124 and the corresponding identifier kb_id are provided to node 110 via network 120. As a result, SW distribution logic 116 is able to include the identifier kb_id in communication 126—e.g., in lieu of the entire kernel binary 124 itself—to indicate to node 130 that the application binary, also provided in communication 126, is to execute with kernel binary 124.

In an embodiment, circuit logic of node 130—e.g., the circuit logic including processor 131 and memory 133—concurrently executes a kernel process and an application process based (respectively) on kernel binary 122 and the application binary which is provided with communication 126. In one example embodiment, node 130 comprises a FPGA (not shown) is programmed to execute the kernel process while processor 131 executes the application process. In some embodiments, node 130 further provides logic to calculate, log and/or otherwise determine test information, debug information or other such performance information based on such process execution. Such performance information is subsequently communicated to node 110, for example, or otherwise made available for use in software development such as that which uses functionality of SW development environment 114.

In various alternative embodiments, node 110 instead omits some or all functionality of SW development environment 114—e.g., where node 110 is instead an intermediary node which is coupled between node 130 and a node which provides such functionality. In one such embodiment, SW distribution logic 116 is coupled to relay (or otherwise support communication on behalf of) software instructions which are generated with the development environment of said other node. In some embodiments, kernel source 122 and/or kernel binary 124 is communicated between nodes 110, 130 via a third node (not shown) of network 120—e.g., wherein node 130 operates as a data storage resource and an application offload resource of the third node.

Figures 2A, 2B:
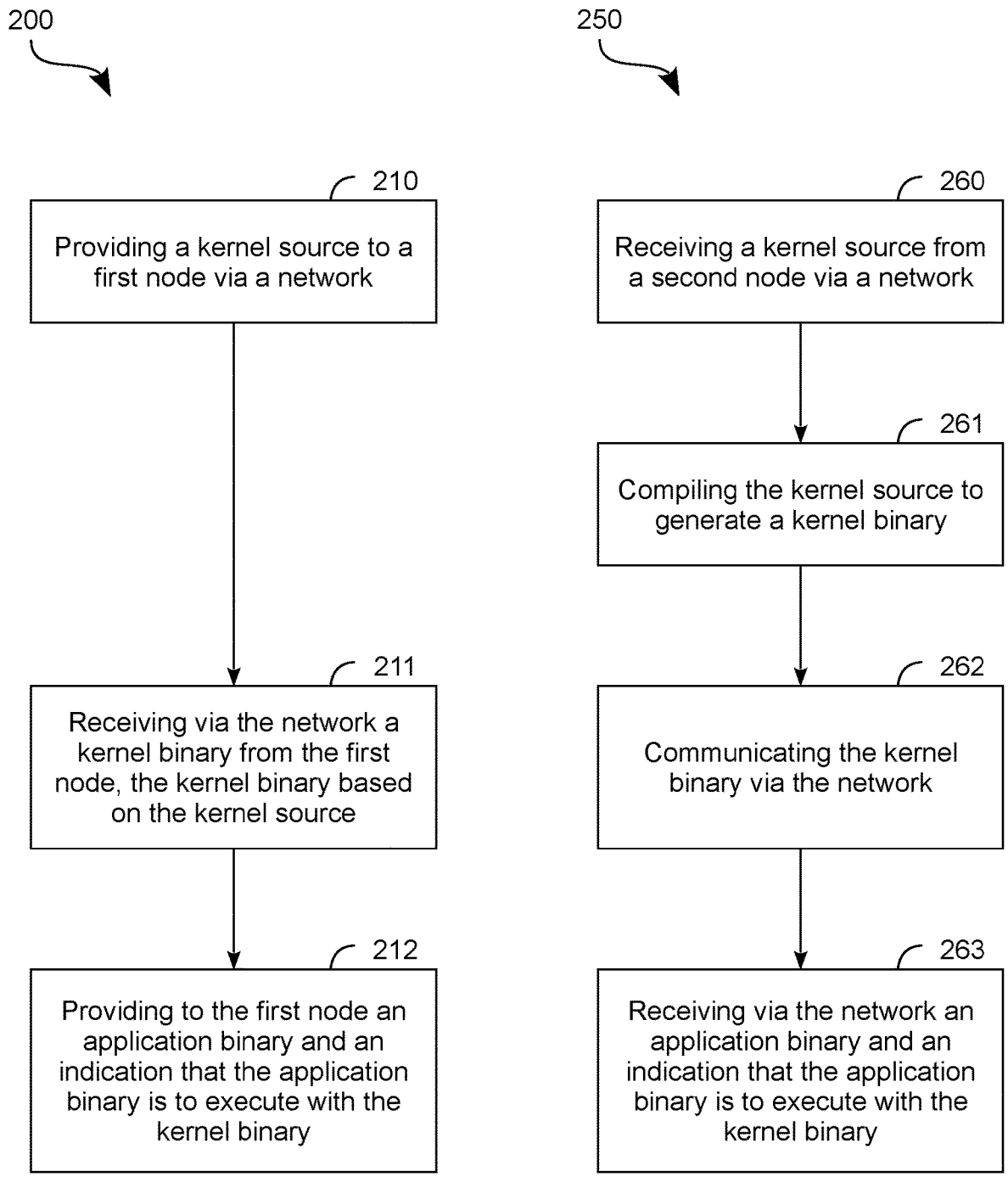
FIGS. 2A, 2B show flow diagrams illustrating respective methods each to communicate a compiled kernel binary via a network according to a corresponding embodiment.

FIGS. 2A, 2B show respective methods 200, 250 each to communicate a compiled kernel binary via a network according to a corresponding embodiment. In one embodiment, method 250 includes operations performed with functionality of a "first node" such as node 130—e.g., wherein method 200 is additionally or alternatively performed with functionality of a "second node" such as node 110.

As shown in FIG. 2A, method 200 includes (at 210) providing a kernel source to a first node via a network—e.g., wherein the providing at 210 comprises, or is otherwise based on, SW distribution logic 116 determining that kernel source 122 is to be transmitted from node 110 to network 120. In some embodiments, the second node comprises logic to provide a GUI, a command-line interface and/or one or more other such software developer tools such as those of SW development environment 114. In one such embodiment, other operations (not shown) of method 200 comprise receiving user input via a user interface of the second node—e.g., wherein the kernel source is edited, uploaded or otherwise determined at the second node based on such input. In an alternative embodiment, the second node is coupled to a third node from which the kernel source is received—e.g., wherein the third node provides a software developer environment. In one such embodiment, the first node operates as a data storage resource and an application offload resource of the second node.

Method 200 further comprises (at 211) receiving via the network a kernel binary from the first node, wherein the kernel binary is based on the kernel source. For example, referring now to FIG. 2B, method 250 comprises (at 260) receiving a kernel source from a second node via a network—e.g., wherein the second node is the node which performs method 200. Method 250 further comprises (at 261) compiling the kernel source, at the same node which received the kernel source at 260, to generate a kernel binary, wherein (at 262) the resulting kernel binary is communicated from the first node via the network.

In some embodiments, the compiling at 261 is performed automatically—e.g., independent of any user interacting with a user interface (if any) of the first node to explicitly request said compiling. In other embodiments, the second node provides an explicit command for the first node to perform such compiling—e.g., wherein the second node further communicates one or more parameters of such a compile command. Alternatively or in addition, one or more parameters for compiling the kernel source are determined based on reference information, maintained at the first node, which describes a hardware configuration of the first node.

Referring again to FIG. 2A, method 200—in some embodiments—further comprises (at 212) providing to the first node an application binary and an indication that the application binary is to execute with the kernel binary. Such an application binary and indication are received by the first node, for example, at 263 of method 250. In one such embodiment, other operations (not shown) of method 200 include—or are otherwise based on—simulation, test, debug and/or other software development processes which contribute to the generation of application source code. Additionally or alternatively, such other operations include compiling said application source code to generate the application binary. In still another embodiment, the application binary is provided to the second node by a third node which provides software development functionality such as that of SW development environment 114. In some embodiments, the indication that the application binary is to execute with the kernel binary comprises the kernel binary itself. Alternatively or in addition, such an indication includes a unique identifier of the kernel binary—e.g., wherein the first node accesses the local copy based on the unique identifier being indicated at 263.

Figure 3:
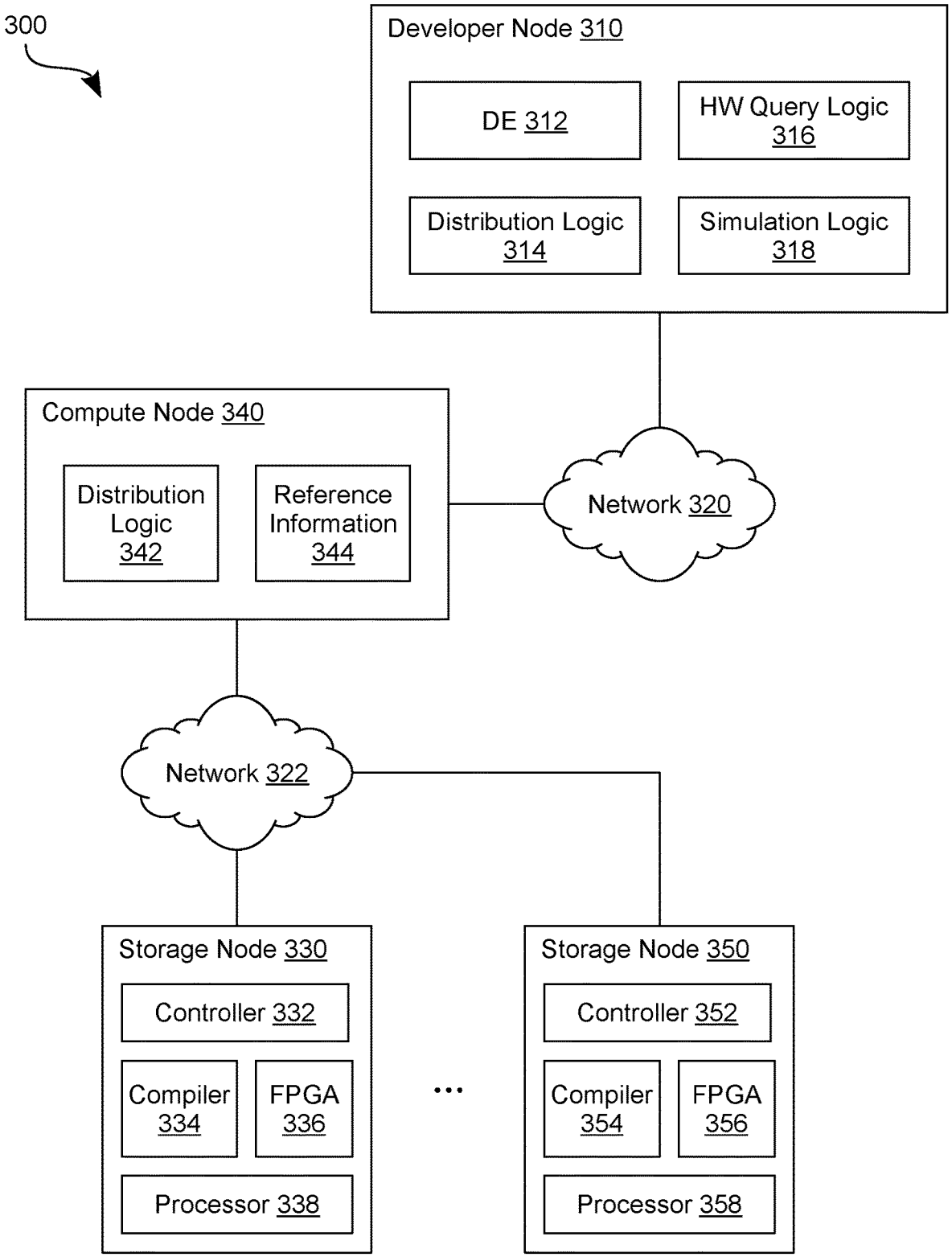
FIG. 3 shows a functional block diagram illustrating elements of a system to communicate software code via a network according to an embodiment.

FIG. 3 shows features of a system 300 to communicate compiled software code via a network according to an embodiment. System 300 is one example of an embodiment wherein a compute node provides kernel source code to a storage node via a network. The storage node compiles kernel source code to generate a kernel binary, which is subsequently communicated via the network to one or more external agents. In some embodiments, system 300 includes features of system 100 and/or facilitates performance of one or both of methods 200, 250.

As shown in FIG. 3, system 300 includes a compute node 340 and a storage node 330 coupled to compute node 340 via the network 322 shown. Storage node 330 operates as a data storage resource and an application offload resource which is available to compute node 340. For example, circuit logic of compute node 340 is operable to execute an operating system and one or more applications, where some computational workload, which targets data stored at storage node 330, is performed with processor logic at storage node 330 on behalf of a process that executes at compute node 340. In an embodiment, such a process executing at compute node 340 is a manager of said computational workload performed at storage node 330—e.g., wherein the process is a consumer of a result which is generated by the computational workload.

System 300 further comprises a developer node 310 which is coupled to compute node 340 via a network 320 (or via network 322, in other embodiments). For example, compute node 340 is coupled between developer node 310 and storage node 330, in some embodiments. In one embodiment, developer node 310 corresponds functionally to node 110—e.g., wherein networks 320, 322 correspond functionally to network 120, and storage node 330 corresponds functionally to node 130. For example, developer node 310 provides a software development environment DE 312 and distribution logic 314 providing functionality of SW development environment 114 and SW distribution logic 116 (respectively). In one such embodiment, storage node 330 comprises a processor 338, a controller 332, and a compiler 334 which, for example, provides functionality of processor 131, controller 132, and compiler 134 (respectively).

In an example scenario according to one embodiment, a user (such as an application developer) uploads or otherwise provides a kernel source to developer node 310—e.g., based on interactions with a user interface of DE 312. A storage node of system 300—storage node 330, for example—is then identified as a target node which is to receive the kernel source. For example, in some embodiments, storage device 330 provides logic to participate in communications which identify—to distribution logic 314 of developer node 310 and/or to distribution logic 342 of compute node 340—a capability of the storage node to compile the kernel source, and to execute a kernel process based on a resulting kernel binary. Based on such communications, the kernel source is transmitted from developer node 310 to storage node 330 via compute node 340 and networks 320, 322.

Circuitry of storage node 330 (e.g., the circuitry including that of controller 332) provides the kernel source to compiler 334, which automatically compiles the kernel source to generate a kernel binary. In some embodiments, the kernel binary is subsequently communicated from storage node 330 to developer node 310 via compute node 340 and networks 320, 322. The kernel binary is thus made available to a user at node 310—e.g., for subsequent software development using DE 312.

By way of illustration and not limitation, DE 312 includes, or otherwise has access to, simulation logic 318 of developer node 310 which enables a simulation of executing software—e.g., where said simulation accounts for a hardware configuration of storage node 330. In one such embodiment, hardware (HW) query logic 316 of developer node 310 provides functionality to query storage node 330—or alternatively, reference information 344 of compute node 340—for a hardware configuration of storage node 330. Such information facilitates the performance of test, debug and/or other software optimization locally at developer node 310.

Such additional software development contributes, for example, to the generation of an application binary which is subsequently communicated to storage node 330—e.g., along with an indication that the application binary is to be executed with the previously-generated kernel binary. In some embodiments, circuit logic of storage node 330 executes a kernel process and an application process based (respectively) on the kernel binary and the application binary. In one example embodiment, storage node 330 comprises a FPGA 336 which is programmed to execute the kernel process while processor 338 executes the application process.

System 300 further comprises one or more additional storage nodes (e.g., including the illustrative storage node 350 shown), although some embodiments are not limited in this regard. In one example embodiment, storage node 350 comprises a controller 352, a compiler 354, a FPGA 356, and a processor 358 which provide functionality of controller 332, compiler 334, FPGA 336, and processor 338 (respectively).

Similar to storage node 330, storage node 350 is operable, in some embodiments, to receive and compile a kernel source provided by developer node 310—e.g., where such compiling generates a kernel binary which node 350 subsequently communicates to developer node 310.

In another embodiment, storage node 350 instead receives a copy of the kernel binary which was generated at storage node 330. Communication of such a copy to storage node 350 is performed, for example, based on a similarity between respective hardware configurations of storage nodes 330, 350. This similarity is detected, for example, at compute node 340 or at developer node 310, although some embodiments are not limited in this regard. In one such embodiment, storage node 350 further receives (or alternatively, generates) a unique identifier for the kernel binary. Such a unique identifier is referenced, for example, in a subsequent communication which indicates that a particular application binary (e.g., provided to storage node 350 by developer node 310) is to be executed with the kernel binary.

Figure 4:
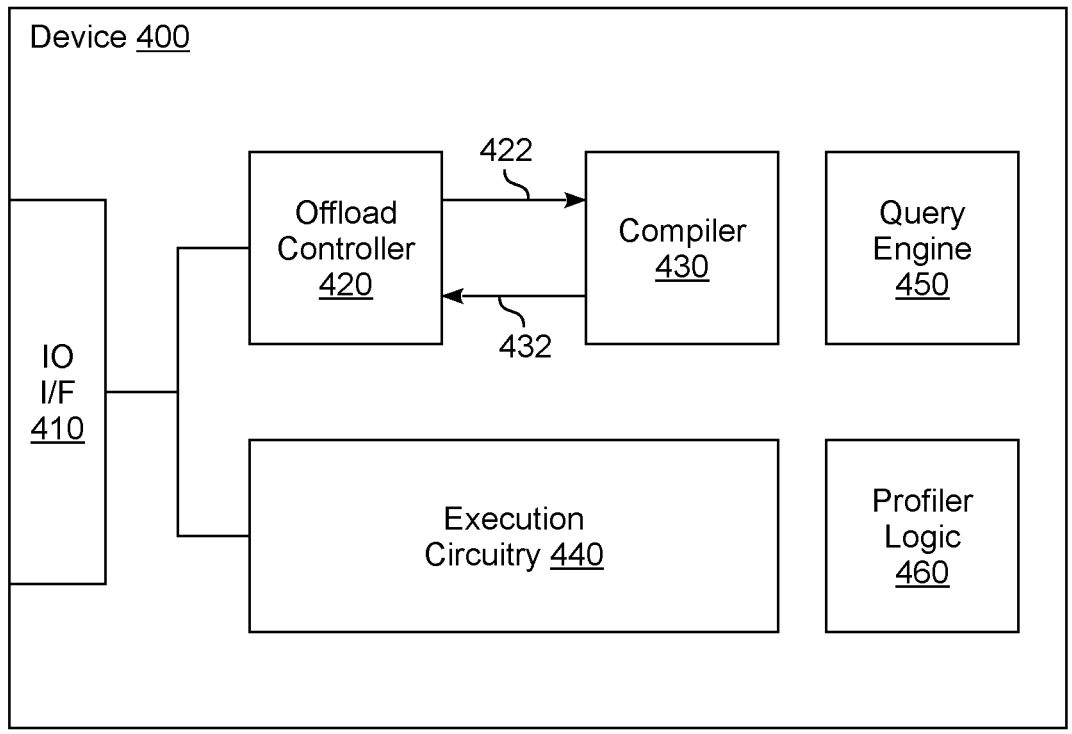
FIG. 4 shows a functional block diagram illustrating elements of a device to communicate a compiled kernel binary via a network according to an embodiment.

FIG. 4 shows features of a device 400 to compile a kernel binary for communication via a network according to an embodiment. In some embodiments, device 400 includes features of node 130 or one of storage nodes 330, 350—e.g., wherein device 400 is configured to perform method 250.

As shown in FIG. 4, device 400 includes an input/output interface IO I/F 410 comprising circuitry by which device 400 is to couple to a network (such as one of networks 120, 322)—e.g., wherein IO I/F 410 supports communication of Transmission Control Protocol (TCP) packets, Hyper Text Transfer Protocol (HTTP) packets and/or other such network communications.

Device 400 further comprises an offload controller 420 and a compiler 430 which, in an embodiment, provide functionality of controller 132 and compiler 134 (respectively). For example, offload controller 420 is coupled to receive a kernel source 422, which is communicated to device 400 via IO I/F 410. The kernel source 422 is provided by offload controller 420 to compiler 430, which subsequently compiles kernel source 422 to generate a corresponding kernel binary 432. In one such embodiment, the kernel binary 432 is provided to offload controller 420 for communication from device 400 via IO I/F 410.

In some embodiments, a copy of kernel binary 432 is stored at a memory resource (not shown) of device 400—e.g., along with a unique identifier which is also made available to a developer node, or other external resource, for use in invoking kernel binary 432. For example, device 400 is further operable to receive an application binary via IO I/F 410—e.g., along with an indication that the application binary is to execute with kernel binary 432. In one such embodiment, execution circuitry 440 of device 400 implement one or both of a kernel process or an application process which executes with such a kernel process. For example, execution circuitry 440 provides functionality of a FPGA to execute a kernel process, and/or a processor to execute an application process—e.g., where execution circuitry 440 includes respective circuitry of processor 338 and FPGA 336.

In some embodiments, device 400 provides additional functionality to facilitate operation is a developer node that is to couple to device 400 via IO I/F 410. By way of illustration and not limitation, a query engine 450 of device 400 provides access to (and in some embodiments, maintains) information describing a configuration of hardware at device 400—e.g., where such information includes a hardware inventory, operational mode/use information, or the like. In one such embodiment, communications by an external resource are able to invoke query engine 450 to request detailed hardware configuration information for use in further software development (e.g., simulating, testing, debugging, etc.) at a remote network node.

Alternatively or in addition, device 400 comprises profiler logic 460 which is operable to log or otherwise collect, and make available to a developer node (or other external resource), performance log, debug log and/or other information describing software execution. Profiler logic 460 thus mitigates a reliance on simulations and performance evaluations being performed at a remote developer node.

Figure 5:
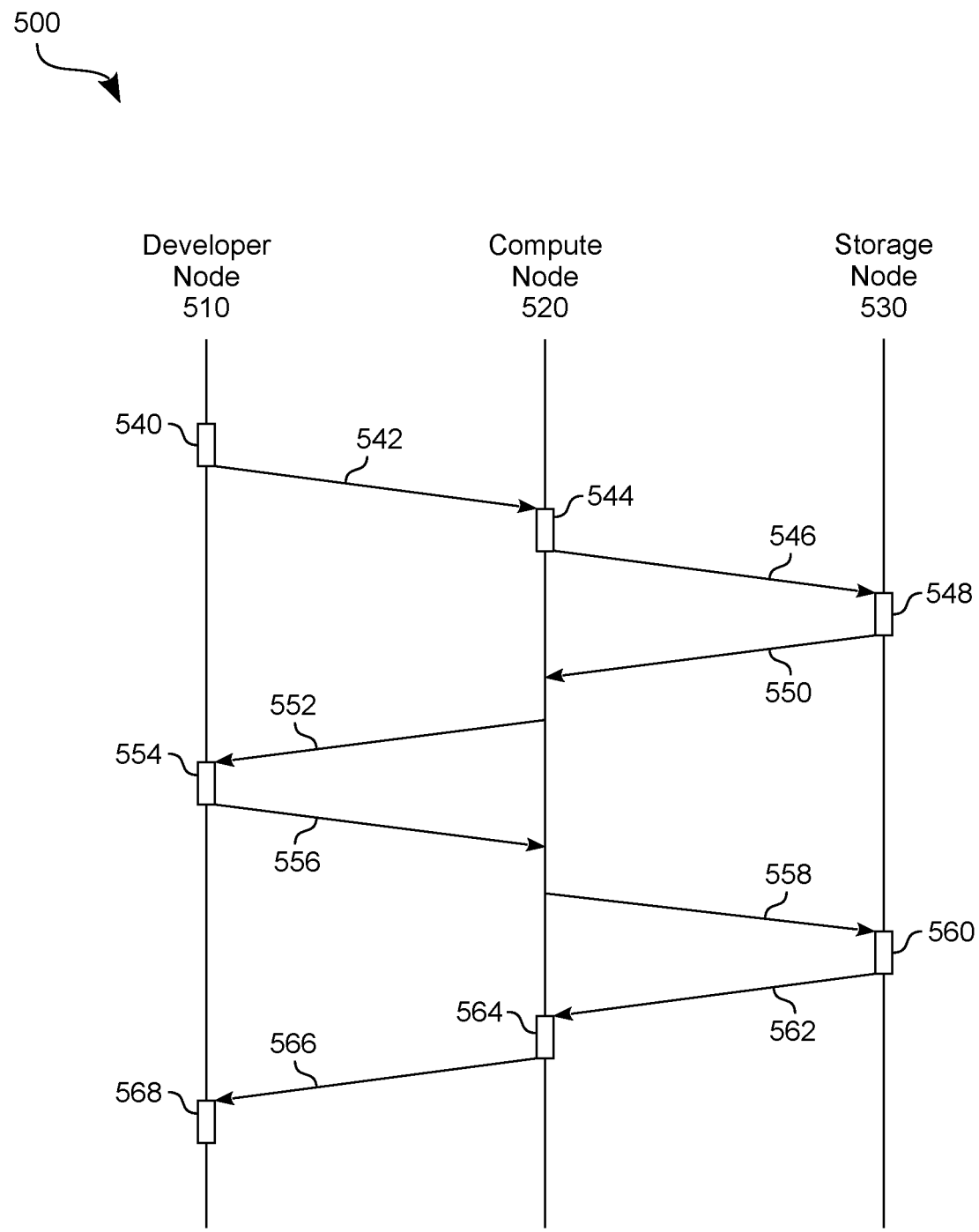
FIG. 5 shows a swim-lane diagram illustrating processes to provide a compiled kernel binary via a network according to an embodiment.

FIG. 5 illustrates a sequence 500 of development time processes (e.g., as opposed to runtime processes) to communicate a compiled kernel binary via a network according to an embodiment. In some embodiments, sequence 500 is performed with one of systems 100, 300—e.g., wherein one or both of methods 200, 250 include or are otherwise based on sequence 500. In the example embodiment shown, sequence 500 is conducted with a developer node 510, a compute node 520, and a storage node 530 which, for example, correspond functionally to developer node 310, compute node 340, and storage node 330 (respectively).

As shown in FIG. 5, sequence 500 comprises operations 540, at developer node 510, to generate or otherwise determine a kernel source. Such operations 540 include, or are otherwise based on, user input being provided via a GUI or other IO interface of a software development environment of developer node 510. Based on operations 540, a communication 542 of the kernel source is provided to compute node 520, which then performs operations 544 to identify storage node 530 as a target node to receive the kernel source. Based on such identifying, compute node 520 provides a communication 546 of the kernel source to storage node 530.

Sequence 500 further comprises operations 548, at storage node 530, to unpack or otherwise prepare the kernel binary for compilation. In some embodiments, storage node 530 also initiates a communication of acknowledgement messages 550, 552 to indicate to developer node 510 that storage node 530 is prepared to compile the kernel source. In one such embodiment, messages 550, 552 further communicate information describing a hardware configuration of storage node 530. By way of illustration and not limitation, operations 554 are performed at developer node 510 to identify, for example, one or more parameters with which storage node 530 is to compile the kernel source—e.g., where such identifying is based on a hardware configuration of storage node 530.

Sequence 500 further comprises messages 556, 558 (based on operations 554) which are communicated to instruct storage node 530 to compile the kernel source. Subsequently, operations 560 at storage node 530 (the operations 560 based on message 558) generate a kernel binary by compiling the kernel source. The kernel source is then provided to developer node 510 by communications 562, 566—e.g., wherein operations 564 at compute node 520 identify developer node 510 as a target which is to receive the kernel binary. Based on the sequence 500, developer node 510 is able to perform additional software development 568 which, for example, generates an application binary to be executed with the kernel binary at storage node 530.

In some embodiments, storage node 530 saves a local copy of the kernel binary, and sends to developer node 510 (e.g., via messages 562, 566) a unique identifier KB_id which has been assigned to the compiled kernel binary. Software distribution logic of the developer node 510 is thus able to simply invoke the identifier KB_id in lieu of including the kernel binary itself in a subsequent communication with storage node 530. In some embodiments, one or more other storage nodes (not shown)—which operate as application offload resources for compute node 520—each receive a respective copy of the kernel binary which is compiled by storage node 530. Such one or more copies are distributed, for example, based on a similarity between the respective hardware configurations of storage node 530 and the one or more other storage nodes. In one such embodiment, the one or more other nodes further receive the unique identifier KB_id—e.g., whereby developer node 510 is able to invoke execution of the same kernel binary at each such similarly configured storage node.

Figure 6:
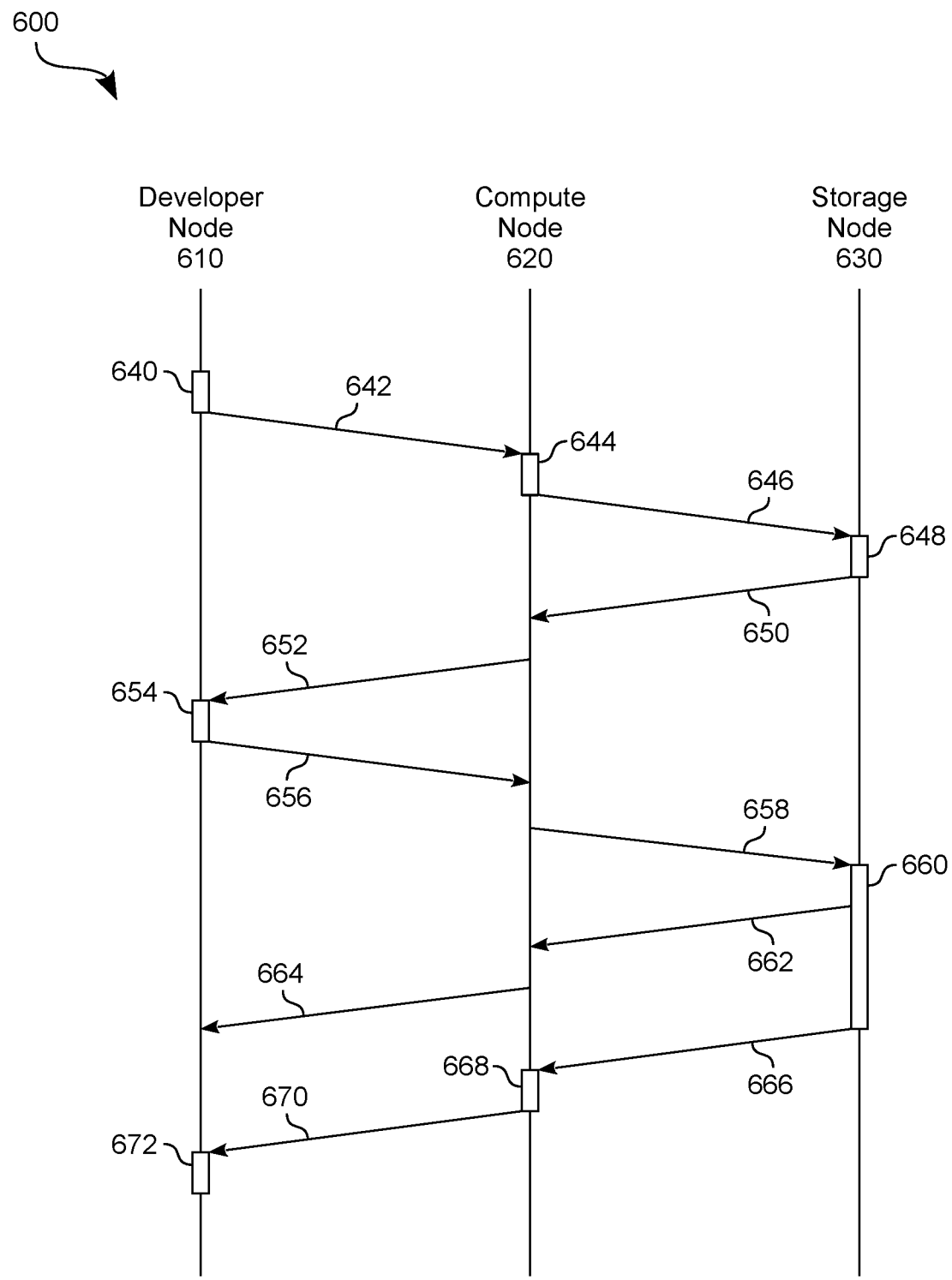
FIG. 6 shows a swim-lane diagram illustrating processes to provide a compiled kernel binary via a network according to an embodiment.

FIG. 6 illustrates a sequence 600 of processes to provide runtime execution of a kernel according to an embodiment. Sequence 600 is performed based on software instructions and/or other information communicated by sequence 500, for example. In some embodiments, sequence 600 is performed with one of systems 100, 300—e.g., wherein one or both of methods 200, 250 include or are otherwise based on sequence 600. In the example embodiment shown, sequence 600 is conducted with a developer node 610, a compute node 620, and a storage node 630 which, for example, correspond functionally to developer node 310, compute node 340, and storage node 330 (respectively).

As shown in FIG. 6, sequence 600 comprises operations 640, at developer node 610, to generate or otherwise determine a binary package which includes an application binary and, in some embodiments, a kernel binary such as that which is communicated by messages 562, 566. Based on operations 640, a communication 642 of the binary package is provided to compute node 620, which then performs operations 644 to identify storage node 630 as a target node to receive the binary package. Based on such identifying, compute node 620 provides a communication 646 of the binary package to storage node 630. In an embodiment, communications 642, 646 also include an indication that the application binary is to be executed with the kernel binary—e.g., wherein communications 642, 646 include a unique identifier that has been assigned to the kernel binary.

Sequence 600 further comprises operations 648, at storage node 630, to unpack or otherwise prepare the binary package for execution of an application process with the kernel process. In some embodiments, storage node 630 also initiates a communication of acknowledgement messages 650, 652 to indicate to developer node 610 that storage node 630 is prepared to execute said processes.

In some embodiments, developer node 610 performs operations 654 (if any) to identify, for example, one or more arguments of a command for storage node 630 to execute the application process and/or the kernel process. Based on operations 654, messages 656, 658 are variously communicated with compute node 620 between to instruct storage node 630 to being runtime execution based on the binary package. Responsive to message 658, storage node 630 begins operations 660 to execute the kernel process based on the kernel binary, and the application process based on the application binary. In an embodiment, acknowledgement messages 662, 664 are variously communicated with compute node 620 to indicate to developer node 610 that process execution has commenced. Additionally or alternatively, messages 666, 670 are variously communicated with compute node 620 to provide from storage node 630 to developer node 610 information describing a process execution of operations 660. In one such embodiment, messages 666, 670 communicate debug log, performance log and/or other information to facilitate additional software development 672 at developer node 610—e.g., wherein operations 668 at compute node 620 identify developer node 610 as a target which is to receive execution performance information.

Figure 7:
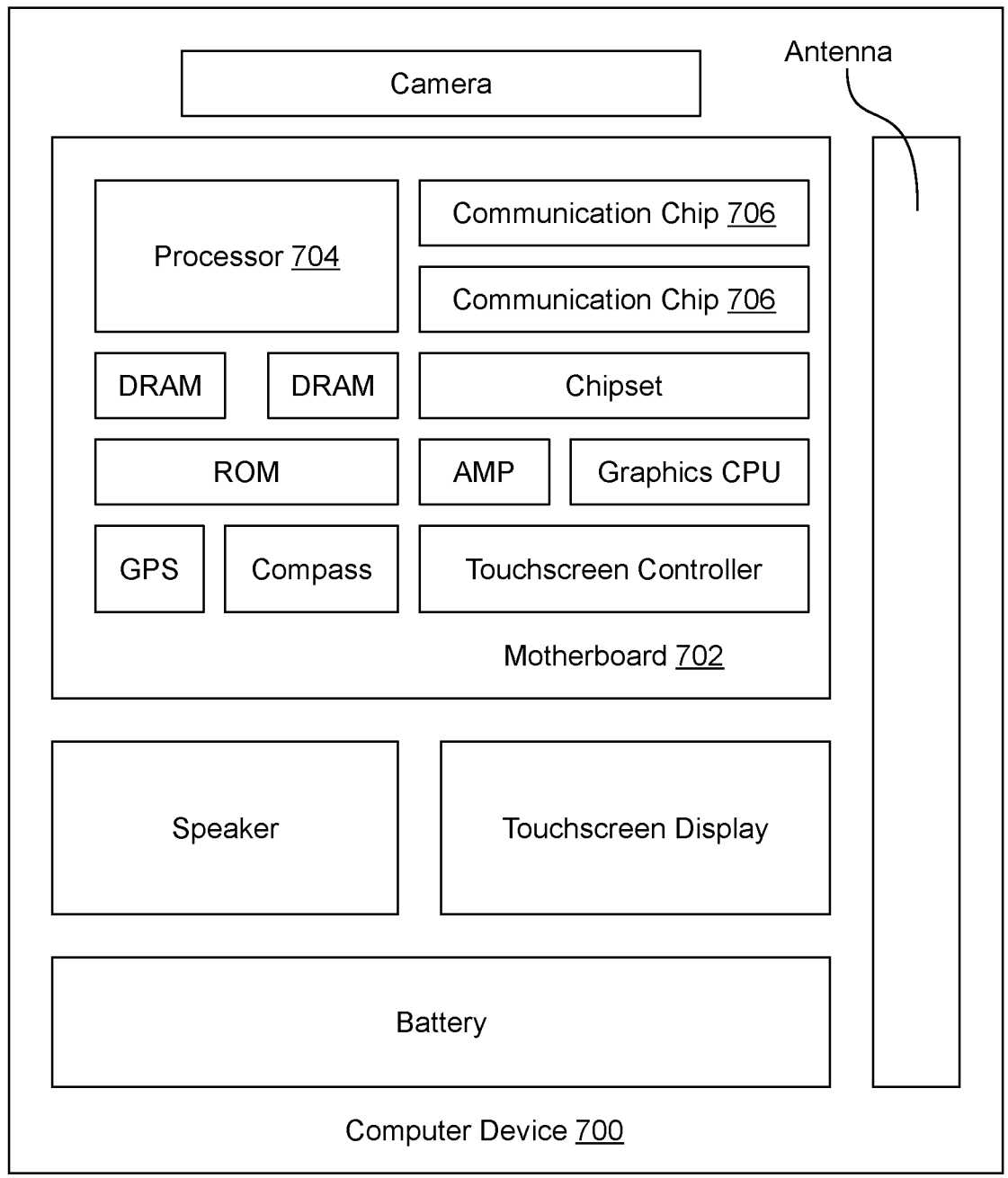
FIG. 7 shows a functional block diagram illustrating a computing device in accordance with one embodiment.

FIG. 7 illustrates a computing device 700 in accordance with one embodiment. The computing device 700 houses a board 702. The board 702 may include a number of components, including but not limited to a processor 704 and at least one communication chip 706. The processor 704 is physically and electrically coupled to the board 702. In some implementations the at least one communication chip 706 is also physically and electrically coupled to the board 702. In further implementations, the communication chip 706 is part of the processor 704.

Depending on its applications, computing device 700 may include other components that may or may not be physically and electrically coupled to the board 702. These other components include, but are not limited to, volatile memory (e.g., DRAM), non-volatile memory (e.g., ROM), flash memory, a graphics processor, a digital signal processor, a crypto processor, a chipset, an antenna, a display, a touchscreen display, a touchscreen controller, a battery, an audio codec, a video codec, a power amplifier, a global positioning system (GPS) device, a compass, an accelerometer, a gyroscope, a speaker, a camera, and a mass storage device (such as hard disk drive, compact disk (CD), digital versatile disk (DVD), and so forth).

The communication chip 706 enables wireless communications for the transfer of data to and from the computing device 700. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 706 may implement any of a number of wireless standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, derivatives thereof, as well as any other wireless protocols that are designated as 3G, 4G, 5G, and beyond. The computing device 700 may include a plurality of communication chips 706. For instance, a first communication chip 706 may be dedicated to shorter range wireless communications such as Wi-Fi and Bluetooth and a second communication chip 706 may be dedicated to longer range wireless communications such as GPS, EDGE, GPRS, CDMA, WiMAX, LTE, Ev-DO, and others.

The processor 704 of the computing device 700 includes an integrated circuit die packaged within the processor 704. The term "processor" may refer to any device or portion of a device that processes electronic data from registers and/or memory to transform that electronic data into other electronic data that may be stored in registers and/or memory. The communication chip 706 also includes an integrated circuit die packaged within the communication chip 706.

In various implementations, the computing device 700 may be a laptop, a netbook, a notebook, an ultrabook, a smartphone, a tablet, a personal digital assistant (PDA), an ultra mobile PC, a mobile phone, a desktop computer, a server, a printer, a scanner, a monitor, a set-top box, an entertainment control unit, a digital camera, a portable music player, or a digital video recorder. In further implementations, the computing device 700 may be any other electronic device that processes data.

Some embodiments may be provided as a computer program product, or software, that may include a machine-readable medium having stored thereon instructions, which may be used to program a computer system (or other electronic devices) to perform a process according to an embodiment. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., infrared signals, digital signals, etc.)), etc.

Figure 8:
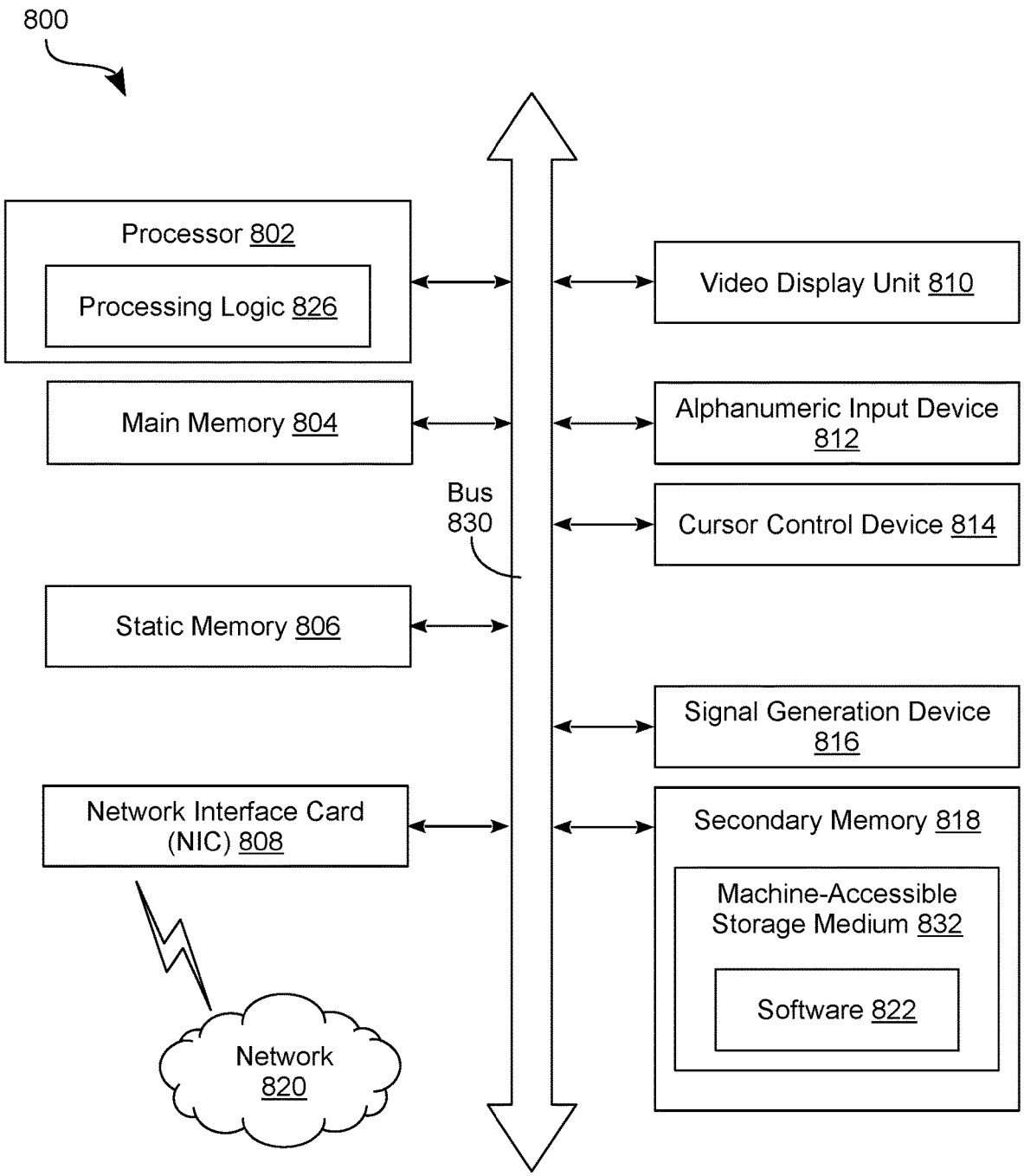
FIG. 8 shows a functional block diagram illustrating an exemplary computer system, in accordance with one embodiment.

FIG. 8 illustrates a diagrammatic representation of a machine in the exemplary form of a computer system 800 within which a set of instructions, for causing the machine to perform any one or more of the methodologies described herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies described herein.

The exemplary computer system 800 includes a processor 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a secondary memory 818 (e.g., a data storage device), which communicate with each other via a bus 830.

Processor 802 represents one or more general-purpose processing devices such as a microprocessor, central processing unit, or the like. More particularly, the processor 802 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 802 may also be one or more special-purpose processing devices such as an application specific integrated circuit (ASIC), a field programmable gate array (FPGA), a digital signal processor (DSP), network processor, or the like. Processor 802 is configured to execute the processing logic 826 for performing the operations described herein.

The computer system 800 may further include a network interface device 808. The computer system 800 also may include a video display unit 810 (e.g., a liquid crystal display (LCD), a light emitting diode display (LED), or a cathode ray tube (CRT)), an alphanumeric input device 812 (e.g., a keyboard), a cursor control device 814 (e.g., a mouse), and a signal generation device 816 (e.g., a speaker).

The secondary memory 818 may include a machine-accessible storage medium (or more specifically a computer-readable storage medium) 832 on which is stored one or more sets of instructions (e.g., software 822) embodying any one or more of the methodologies or functions described herein. The software 822 may also reside, completely or at least partially, within the main memory 804 and/or within the processor 802 during execution thereof by the computer system 800, the main memory 804 and the processor 802 also constituting machine-readable storage media. The software 822 may further be transmitted or received over a network 820 via the network interface device 808.

While the machine-accessible storage medium 832 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any of one or more embodiments. The term "machine-readable storage medium" shall accordingly be taken to include, but not be limited to, solid-state memories, and optical and magnetic media.

Techniques and architectures for providing software via a network are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. A device comprising:
   first circuitry to couple the device to a network, the first circuitry further to receive a kernel source via the network;
   second circuitry to store reference information which describes a hardware configuration of the device;
   third circuitry coupled to the first circuitry and the second circuitry, the third circuitry configured to access the reference information and to automatically compile the kernel source, based on the hardware configuration of the device, to generate a kernel binary;
   fourth circuitry coupled to the third circuitry, the fourth circuitry configured to automatically communicate the kernel binary from the device via the first circuitry, wherein the first circuitry is further to receive via the network an application binary and an indication that the application binary is to execute with the kernel binary, wherein the application binary is generated based on the kernel binary; and
   fifth circuitry, coupled to the first circuitry, to execute the application binary with the kernel binary based on the indication.

2. The device of claim 1, further comprising:
   sixth circuitry configured to assign a unique identifier to the kernel binary, wherein the second circuitry is further configured to automatically communicate the unique identifier from the device via the network, wherein the indication that the application binary is to execute with the kernel binary comprises the unique identifier.

3. The device of claim 1, further comprising:
   sixth circuitry to generate performance information based on an execution of the application binary with the kernel binary;
   seventh circuitry to communicate the performance information from the device via the network.

4. The device of claim 1, wherein the fifth circuitry is to execute the application binary with the kernel binary to provide an application offload resource via the network.

5. The device of claim 1, wherein the third circuitry is further to automatically communicate a copy of the kernel binary to another device via the first circuitry, wherein the third circuitry is to communicate the copy based on a similarity of respective hardware configurations of the device and other device.

6. The device of claim 5, further comprising:
   sixth circuitry to assign a unique identifier to the kernel binary; and
   seventh circuitry to automatically communicate the unique identifier to the other device via the network, wherein the indication that the application binary is to execute with the kernel binary comprises the unique identifier.

7. The device of claim 1, further comprising:
   a field programmable gate array to be programmed based on the kernel binary.

8. A method at a first node of a network, the method comprising:
   storing reference information which describes a hardware configuration of the first node;
   receiving a kernel source from a second node coupled to the first node via the network;
   automatically compiling the kernel source, based on the hardware configuration of the first node, to generate a kernel binary;
   automatically communicating the kernel binary from the first node via the network;
   receiving via the network an application binary and an indication that the application binary is to execute with the kernel binary, wherein the application binary is generated based on the kernel binary; and
   executing the application binary with the kernel binary based on the indication.

9. The method of claim 8, further comprising:
   assigning a unique identifier to the kernel binary; and
   automatically communicating the unique identifier from the first node via the network, wherein the indication that the application binary is to execute with the kernel binary comprises the unique identifier.

10. The method of claim 8, wherein executing the application binary with the kernel binary is to provide an application offload resource via the network.

11. The method of claim 8, further comprising:
    automatically communicating a copy of the kernel binary, via the network, to a third node based on a similarity of respective hardware configurations of the first node and the third node.

12. The method of claim 8, further comprising:
    programming a field programmable gate array of the first node based on the kernel binary.

13. One or more non-transitory computer-readable storage media having stored thereon instructions which, when executed by one or more processing units, perform a method at a first node of a network, the method comprising:
    providing a kernel source to a second node via the network, wherein the second node stores reference information which describes a hardware configuration of the second node, and wherein the second node automatically compiles the kernel source, based on the hardware configuration of the second node, to generate a kernel binary;
    receiving the kernel binary from the second node via the network;
    determining an application binary based on the kernel binary; and
    providing to the second node, via the network, the application binary and an indication that the application binary is to execute with the kernel binary, wherein the second node executes the application binary with the kernel binary based on the indication.

14. The one or more computer-readable storage media of claim 13, wherein the method further comprises:
    receiving, from the first node via the network, a unique identifier assigned to the kernel binary, wherein the indication that the application binary is to execute with the kernel binary comprises the unique identifier.

15. The one or more computer-readable storage media of claim 13, wherein the method further comprises:
   sending to the second node a parameter of an instruction to compile the kernel source, wherein the parameter is based on the hardware configuration of the second node.

16. The one or more computer-readable storage media of claim 13, wherein determining the application binary is based on a user interaction with a software developer environment provided with the first node.

17. The one or more computer-readable storage media of claim 13, wherein the second node executes the application binary with the kernel binary to provide an application offload resource via the network.

18. The one or more computer-readable storage media of claim 17, wherein the application offload resource is provided to the first node via the network.

19. The one or more computer-readable storage media of claim 13, wherein the method further comprises:
   automatically communicating a copy of the kernel binary, via the network, to a third node based on a similarity of respective hardware configurations of the first node and the third node.

* * * * *